I. COOPER & O. F. PRESBREY.
CLAMP.
APPLICATION FILED NOV. 25, 1916.

1,274,689.

Patented Aug. 6, 1918.

WITNESS

INVENTOR
OTIS F. PRESBREY
ISIDOR COOPER
BY THEIR
ATTORNEY

UNITED STATES PATENT OFFICE.

ISIDOR COOPER AND OTIS F. PRESBREY, OF BROOKLYN, NEW YORK, ASSIGNORS TO OTIS-FLAGG CORPORATION, OF NEW YORK, N. Y., A CORPORATION OF NEW YORK.

CLAMP.

1,274,689.      Specification of Letters Patent.      Patented Aug. 6, 1918.

Application filed November 25, 1916. Serial No. 133,290.

*To all whom it may concern:*

Be it known that we, ISIDOR COOPER and OTIS F. PRESBREY, citizens of the United States, and residents of Brooklyn, in the county of Kings and State of New York, have invented certain new and useful Improvements in Clamps, of which the following is a specification.

The invention pertains more particularly to clamps of the character employed for binding a piece of hose onto a nipple or pipe.

One of the main purposes of the invention is to provide an efficient clamp which may be inexpensively manufactured and readily adjusted for and applied to varying diameters of hose or pipes, the carrying in stock of a large number of clamps each adapted to some special diameter of hose or pipe being by our invention rendered unnecessary.

The clamp of our invention, aside from the final securing screw and nut, comprises three main parts, one being a ribbon, strip or band of metal and the other two being heads to which the ends of the strip or band are connected and which receive the final securing screw and nut by which the band may be bound upon a piece of hose or the like, and one of said heads having integrally therewith a tongue to span the space between the two heads, so that when the clamp is finally applied to position it may extend entirely around the hose or other article.

The invention will be fully understood from the detailed description hereinafter presented, reference being had to the accompanying drawings, in which.

Figure 1:
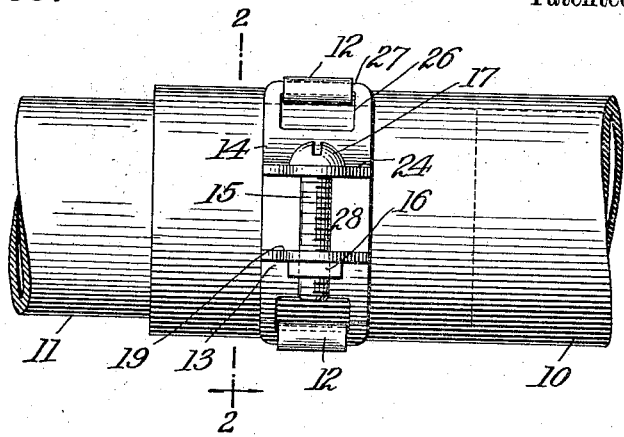
Figure 1 is a top view, partly broken away, of a piece of hose and a piece of pipe bound together by a clamp constructed in accordance with and embodying our invention.

In the drawings, 10 designates a piece of hose bound to a piece of pipe or a nipple 11 by a clamp embodying my invention and which comprises a flexible metallic strip or band 12, heads 13, 14 to which the ends of said strip or band are respectively connected in an adjustable manner, a screw 15 and a nut 16 which engages one of said heads and receives the threaded portion of said screw, said screw preferably having at one end a slotted head 17 adapted to be engaged by an ordinary screw-driver or the like.

The strip or band 12 is a plain flat strip or ribbon and may be of any length suited to the diameter of the hose 10.

The head 13 has a curved base member 18 and an outwardly projecting or angle-member 19 containing a hole 20 for the screw 15. The base-member 18 contains an opening 21, which provides at the outer edge of said member a cross-bar 22 to receive one end of the band 12 in a manner which will be readily understood on reference to Fig. 2. The head 14 is formed with a curved base member 23 and an outwardly projecting member 24 corresponding with the member 19 of the head 13 and containing a hole 25 for the screw 15. The base member 23 of the head 14 is formed with an opening 26 whereby a cross-bar 27 is left to receive one end of the strap or band 12, as illustrated at the left hand side of Fig. 2. The head 14 differs from the head 13 in that the head 14 is formed integrally with a tongue 28 to span the space between the heads 13, 14 when the clamp is applied to position. The tongue 28 is formed by folding the metal strip from which the head is formed reversely at the cross-bar 27, said tongue thus extending from said cross-bar below the base 23 and sufficiently beyond said base to lie, when the clamp is in position, below the base member 18 of the head 13. The metal strip from which the tongue 28 is formed has an opening through it in line with the opening 26 in the base member 23, so that said tongue may not interfere with the proper application of the strip or band 12 to the cross-bar 27.

Figure 2:
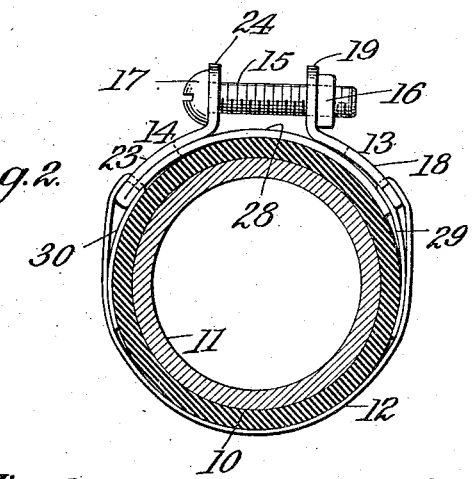
Fig. 2 is a vertical transverse section through the same, taken on the dotted line 2—2 of Fig. 1.
Figure 3:
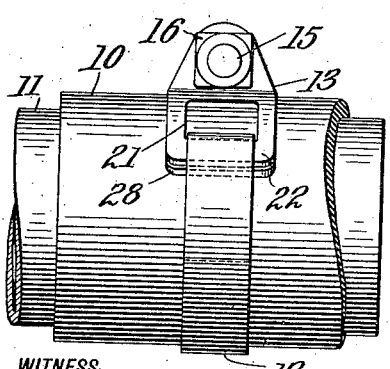
Fig. 3 is a side elevation, partly broken away, of the same.
Figure 4:
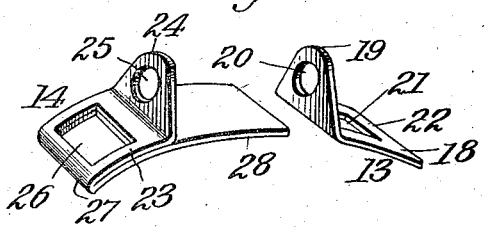
Fig. 4 illustrates, in perspective, the heads which in use receive the respective ends of the metal strip or band and the final securing screw and nut.

In assembling the parts of the clamp one end of the strip 12 is inserted through the opening 21 of the head 13 and preferably bent downwardly along the inner side of the cross-bar 22 of said head, as shown in Fig. 2, and the other end of the strip or band 12 is inserted through the opening 26 of the head 14 and preferably bent downwardly along the inner side of the cross-bar 27 of said head 14, a sufficient length of strip or band 12 being employed to suit the diameter of the hose 10. The strip or band 12 is flexible, and the strip or band shown may be adjusted to varying diameters of hose by carrying its end portions to a greater or less extent through the openings in the heads 13, 14. The ends of the strip or band 12 need not be permanently fastened to the heads 13, 14 and preferably will be simply slipped through the openings in said heads and bent downwardly at the inner sides of the cross-bars thereof, the inwardly extending portions numbered 29, 30, respectively, becoming rigidly connected with the heads 13, 14 when the clamp is applied to position and said portions are bound against the face of the hose. The adjustment of the band 12 to varying diameters of hose may be accomplished by varying the length of the band carried through the opening in either head 13, 14, but preferably we will leave both ends of the band 12 free for adjustment with relation to said heads. Preferably the strip or band 12 and heads 13, 14 will be assembled at the time the clamp is to be applied to the hose or other article, and in this way the clamp may be very readily adapted to varying diameters of hose.

The simple construction of the parts of the clamp and the readiness with which said parts may be assembled will be appreciated without extended comment. The strip 12 is simply one uniform continuous piece or ribbon of sheet metal requiring no attention with the exception of connecting one end thereof with the cross-bar 22 of the head 13 and the other end thereof with the cross-bar 27 of the head 14. The heads 13, 14 may be stampings and they receive the screw 15 and nut 16 in a well-known manner. The clamp is composed of but few inexpensive and readily assembled parts and is efficient in use.

What we claim as our invention and desire to secure by Letters Patent, is:

1. A clamp of the character described comprising a plain uniform flexible strip, independent heads to which the ends of said strip are respectively connected and means for drawing said heads toward each other, said heads being of angle shape and having base members containing openings through which the ends of said strip are folded and also outwardly projecting members to receive the means for drawing the heads toward each other, and one of said heads having a tongue to span the space between the heads.

2. A clamp of the character described comprising a plain uniform flexible strip, heads having curved base members provided with openings and members extending outwardly therefrom having alined openings through them, and a screw and nut applied to said outwardly extending members for drawing said heads toward each other, said strip at its ends being extended through the openings in the base members for connection with said members, and one of said heads having a tongue extending from its base member to span the space between the heads.

3. A clamp of the character described comprising a plain uniform flexible strip, heads having curved base members provided with openings and members extending outwardly therefrom having alined openings through them, and a screw and nut applied to said outwardly extending members for drawing said heads toward each other, said strip at its ends being extended through the openings in said base members and folded against the cross-bars left by said openings, and one of said heads having integrally therewith a tongue spanning the space between said heads and being underneath both of said base members.

Signed at Brooklyn, in the county of Kings, and State of New York, this 22nd day of November, A. D. 1916.

ISIDOR COOPER.
OTIS F. PRESBREY.

Witnesses:
ARTHUR MARION,
CHAS. C. GILL.

Copies of this patent may be obtained for five cents each, by addressing the "Commissioner of Patents. Washington, D. C."